United States Patent [19]

Huber et al.

[11] Patent Number: 4,843,430
[45] Date of Patent: Jun. 27, 1989

[54] APPARATUS FOR PROCESSING PHOTOSENSITIVE MATERIAL FROM MOBILE CASSETTES

[75] Inventors: Leonhard Huber, Glonn; Bernd Payrhammer, Munich, both of Fed. Rep. of Germany

[73] Assignee: Agfa-Gevaert Aktiengesellschaft, Leverkusen, Fed. Rep. of Germany

[21] Appl. No.: 175,161

[22] Filed: Mar. 30, 1988

[30] Foreign Application Priority Data

Apr. 17, 1987 [DE] Fed. Rep. of Germany ....... 3713171

[51] Int. Cl.$^4$ ..................... G03B 27/32; G03B 27/52; G03D 17/00
[52] U.S. Cl. ....................................... 355/27; 354/313
[58] Field of Search .................. 355/27, 100; 354/297, 354/313-315, 341; 156/502; 352/76 R, 72

[56] References Cited

U.S. PATENT DOCUMENTS 3,997,252  12/1976  Hapke et al. .......................... 352/72
4,076,135  2/1978   Klose ............... 354/313 X
4,094,726  6/1978   Hujer et al. ..................... 354/313 X

FOREIGN PATENT DOCUMENTS 3150495  6/1983  Fed. Rep. of Germany .
3151932  7/1983  Fed. Rep. of Germany .

Primary Examiner—Richard A. Wintercorn
Attorney, Agent, or Firm—Peter K. Kontler

[57] ABSTRACT

A photographic printing or developing machine has a station for processing bands of photographic material. The processing station has an inlet side and an outlet side. A first station provided with several receiving areas of wheeled take-off cassettes carrying coiled bands of photographic material is located adjacent to the inlet side. A second station provided with several receiving areas for wheeled, empty take-up cassettes is disposed adjacent to the outlet side. The first and second stations each have a mechanism for conveying and guiding bands of photographic material between the processing station and the various receiving areas. Furthermore, a detecting mechanism is located at each receiving area and the detecting mechanism, as well as the conveying and guiding mechanism, are connected to an electronic control unit. In operation, a loaded take-off cassette is positioned at each receiving area of the first station and an empty take-up cassette is positioned at each receiving area of the second station.

23 Claims, 8 Drawing Sheets

4,843,430

APPARATUS FOR PROCESSING PHOTOSENSITIVE MATERIAL FROM MOBILE CASSETTES

CROSS-REFERENCE TO RELATED CASE

This application contains subject matter related to that of commonly-owned U.S. patent application Ser. No. 175,160 filed Mar. 30, 1988.

BACKGROUND OF THE INVENTION

The invention relates generally to processing of photosensitive material.

More particularly, the invention relates to an apparatus, e.g., a printer or developing machine, for processing photosensitive material such as photographic paper or film.

It is known to transport reels of photographic material in wheeled cassettes which are provided with a spool for the photographic material and have an opening serving as an entrance or exit for the material. Photographic processing apparatus capable of operating with such cassettes are likewise known and a conventional apparatus of this type includes a processing station as well as cassette locating means on either side of this station. One side of the processing station constitutes an inlet for photographic material to be processed and the associated cassette locating means functions to properly locate a supply or take-off cassette, i.e., a cassette with a reel of photographic material to be processed, in an operative position adjacent to the inlet. The other side of the processing station constitutes an outlet for material which has undergone processing and the corresponding cassette locating means serves to properly locate a take-up cassette, that is, a cassette with an empty spool, in an operate position adjacent to the outlet. The apparatus further includes means for automatically conveying photographic material from the take-off cassette into the processing station and automatically threading the material into the take-up cassette.

A copying apparatus of the type described above is known, for example, from the West German Offenlegungsschrift No. 31 51 932. The copying apparatus is designed so that a roll of photographic material from a take-off cassette placed adjacent to the apparatus can be automatically threaded into the latter. A mobile cassette which can be used in conjunction with such a conventional copying apparatus is known from the West German Offenlegungsschrift No. 31 50 495. Moreover, the use of such mobile cassettes together with copying apparatus having automatic paper infeed and outfeed devices is known from commercially available apparatus of this type.

When the take-off cassette becomes empty and the take-up cassette becomes full in a conventional processing apparatus, operating personnel must remove the cassettes and replace the latter with a fresh take-off cassette and a fresh take-up cassette, respectively. This requires monitoring of the degree of filling of the cassettes, either visually or by means of appropriate indicators on the apparatus, and the presence of operating personnel.

A copying apparatus equipped with a pair of vertically oriented rotary discs has also been proposed. One of the discs carries several take-off cassettes while the other carries a number of take-up cassettes. When a take-off cassette becomes empty or a take-up cassette becomes full, the next cassette is automatically rotated into the respective operative position. This apparatus has the drawback that deposition of the large cassettes on the rotary disc is relatively difficult. Furthermore, the drives for the rotary discs must be capable of moving the large masses of the several cassettes carried by the discs. This makes the overall arrangement large as well as heavy.

OBJECTS AND SUMMARY OF THE INVENTION

It is an object of the invention to provide a processing apparatus for photosensitive material which does not require movement of the combined masses of several cassettes.

Another object of the invention is to provide a processing apparatus for photosensitive material which does not require difficult manipulation of cassettes.

An additional object of the invention is to provide a relatively simple method of operating a processing apparatus for photosensitive material which is designed for use with mobile cassettes.

A further object of the invention is to provide a processing apparatus for photosensitive material which can be used with mobile cassettes adapted to carry reels of photosensitive material and is designed in such a manner that changeover to a new reel can be performed automatically one or more times without the presence of operating personnel.

The preceding objects, as well as others which will become apparent as the description proceeds, are achieved by the invention.

One aspect of the invention resides in an apparatus for processing photosensitive material, e.g., a photographic apparatus for processing photographic paper or film. The apparatus comprises a processing station for photosensitive material and this processing station may, for example, include a printer or a developing machine. The apparatus further comprises at least one cassette receiving station to one side of the processing station designed to accommodate a plurality of mobile, carriage-like cassettes for photosensitive material at respective locations or receiving areas of the receiving station. Means is provided for conveying and guiding photosensitive material between the processing station and each receiving area of the cassette receiving station. The apparatus also includes detecting means for sensing the presence and absence of photosensitive material in the region of each such receiving area. The apparatus additionally comprises control means operable to activate the conveying and guiding means in response to signals from the detecting means. The control means causes the conveying and guiding means to transport photosensitive material between the processing station and a preselected receiving area of the cassette receiving station when the detecting means issues a predetermined signal from the region of the preselected receiving area.

An additional cassette receiving station may be disposed to another side of the processing station, e.g., the side of the processing station opposite that with the first cassette receiving station. This additional receiving station is again designed to accommodate a plurality of mobile, carriage-like cassettes at respective additional locations or receiving areas of the additional receiving station. Additional detecting means is provided for sensing the presence and absence of photosensitive material in the region of each receiving area of the additional cassette receiving station. Moreover, the apparatus here includes additional means for conveying and guiding photosensitive material between the processing station and the respective receiving areas of the additional receiving station. As before, the control means is operable to activate the additional conveying and guiding means in response to signals from the additional detecting means. Thus, the control means causes the additional conveying and guiding means to transport photosensitive material between the processing station and a preselected receiving area of the additional cassette receiving station when the additional detecting means issues a predetermined signal from the region of this preselected receiving area.

Each of the cassette receiving stations is preferably designed to position all of the cassettes accommodated thereby in the same orientation. The receiving stations may be provided with means for locating the cassettes in predetermined operative positions at the respective receiving areas.

The conveying and guiding means for each receiving station may include a guide in the region of each receiving area as well as a drive in the region of each such area. Alternatively, each conveying and guiding means may include a guide and/or a drive which is movable between the different receiving areas of the respective receiving station. The guides may function to change the direction of travel of the photosensitive material if the latter enters and leaves the cassettes in directions different from the direction of transport of the photosensitive material through the processing station.

Each drive may be disposed within the associated guide. It is also possible to mount the drives in the cassettes.

The detecting means for each receiving station preferably includes a detector in the region of each receiving area.

The apparatus of the invention is advantageously designed to operate with cassettes of the type which transport photosensitive material in the form of coils or rolls. Such a cassette may be provided with a spool for the photosensitive material and an opening constituting an entrance or exit for the material.

A first one of the receiving stations may include an inlet to the processing station and the second of these stations may include an outlet from the processing station. The first station then receives loaded supply or take-off cassettes, that is, cassettes carrying rolls of photosensitive material to be processed, while the second station receives empty take-up cassettes. The conveying and guiding means may here be designed to automatically withdraw photosensitive material from a cassette at the first station, convey the material through the processing station and introduce the material into a cassette at the second station.

The control means may be designed so that, at any time, photosensitive material is withdrawn from only one of the take-off cassettes at the first station. When the detector associated with this cassette no longer senses photosensitive material, the cassette is empty and the detector sends a corresponding signal to the control means. The control means thereupon activates the drive associated with another take-off cassette at the first station, namely, a loaded take-off cassette.

Similarly, the control means may be designed in such a manner that, at any moment, photosensitive material is being fed into only one of the take-up cassettes at the second station. Upon receipt of a signal indicating that this cassette is full, the control means activates the drive corresponding to another, empty take-up cassette at the second station.

The invention thus makes it possible to automatically transport photosensitive material into a processing station from a loaded and ready take-off cassette when a take-off cassette previously in use becomes empty. Similarly, the invention allows photosensitive material to be automatically fed from the processing station into an empty and waiting take-up cassette when a take-up cassette in the process of being loaded becomes full. In this regard, it is of advantage to equip the processing apparatus with one or more indicators which show when the last of the loaded take-off cassettes and the last of the empty take-up cassettes comes into operation. The emptied take-off cassettes can then be replaced by full take-off cassettes and, by the same token, the filled take-up cassettes can be replaced by empty ones.

By virtue of the invention, replacement of take-off cassettes need take place only after two or more such cassettes have been used. The same applies for take-up cassettes. Although operating personnel must then replace two or more cassettes in each case, the invention nevertheless provides the advantage that the time intervals between replacements, and hence the time intervals between those periods when operating personnel must be available for cassette replacement, may be extended.

The novel features which are considered as characteristic of the invention are set forth in particular in appended claims. The improved processing apparatus itself, however, both as to its construction and its mode of operation, together with additional features and advantages thereof, will be best understood upon perusal of the following detailed description of certain specific embodiments when read in conjunction with the accompanying drawings.

DESCRIPTION OF THE PREFERRED EMBODIMENTS

Figure 1:
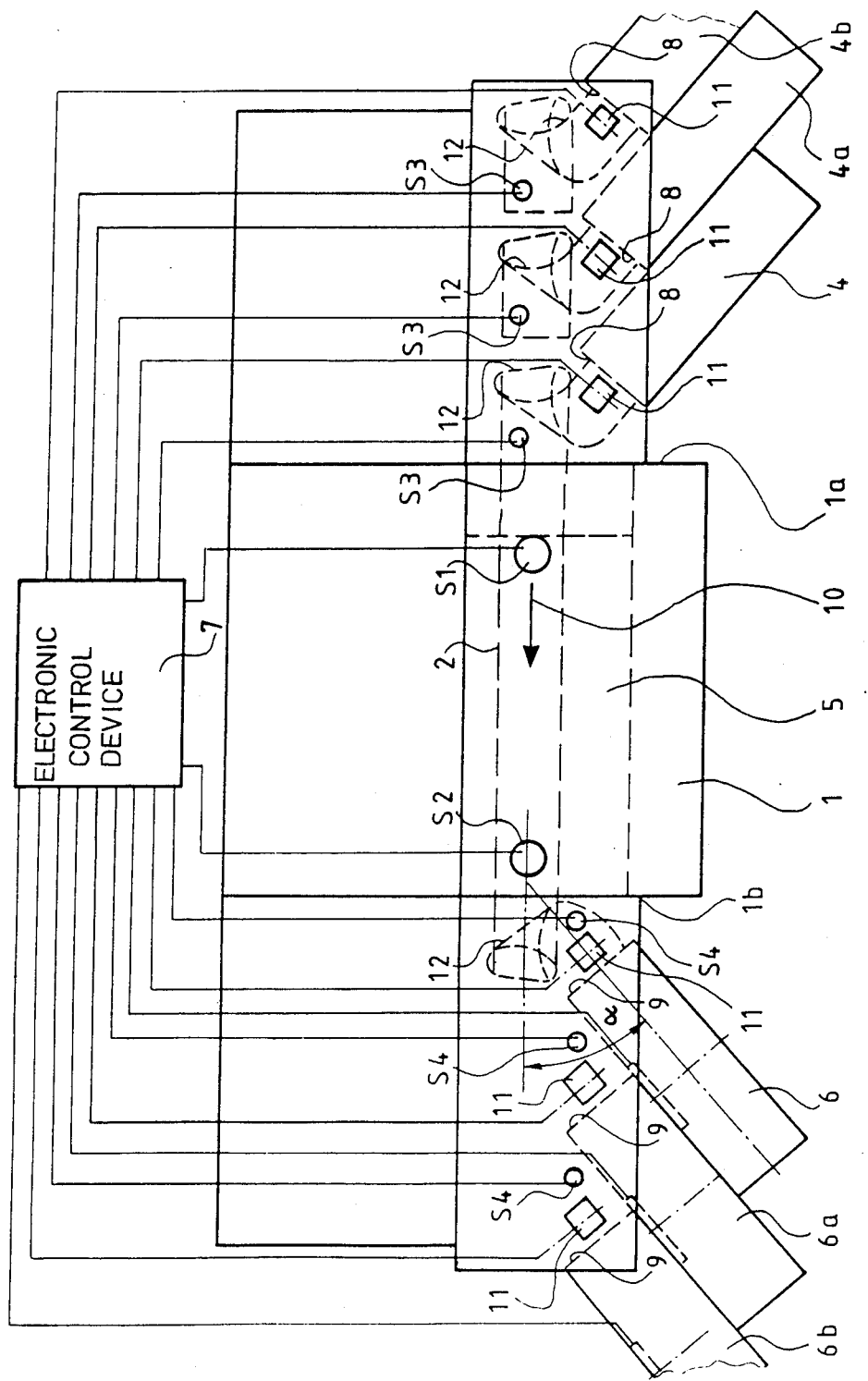
FIG. 1 is a schematic plan view of an apparatus according to the invention for processing photosensitive material.

Throughout the drawings, the same reference numerals are used to identify similar elements.

The drawings illustrate an apparatus in accordance with the invention for processing photosensitive material. The apparatus, which is generally identified by the reference numeral 1, is here assumed to be a photographic apparatus. Specifically, the apparatus 1 is shown as being in the form of a photographic printer. However, this is by way of example only and is not intended to limit the nature of the apparatus 1. For instance, the apparatus 1 could just as well be constituted by a photographic developing machine.

Referring to FIG. 1, the apparatus 1 which, as mentioned, is in the form of a printer, includes a printing or exposure station 5 constituting a processing station (the printing station 5 would be replaced by a developing station if the apparatus 1 were a developing machine). A non-illustrated, large spool or reel is rotatably mounted in the printer 1 and carries a series of developed filmstrips which have been spliced to one another and coiled onto the spool. The filmstrips are transported through the printing station 5 and, after the production of copies, are wound onto a non-illustrated take-up spool or reel of the printer 1.

Exposure and, if desired, enlargement, of the filmstrips are performed on photosensitive material constituted by photographic paper or copy material 2. The photographic paper 2 is supplied in the form of a large roll which is carried by a mobile, carriage-like take-off or supply cassette 4. The take-off cassette 4 is located in an operative position at a cassette receiving station to one side of the printing station 5. A take-up cassette 6 is disposed in an operative position at another cassette receiving station adjacent to the opposite side of the printing station 5. The take-up cassette 6 is initially empty.

Figure 4:
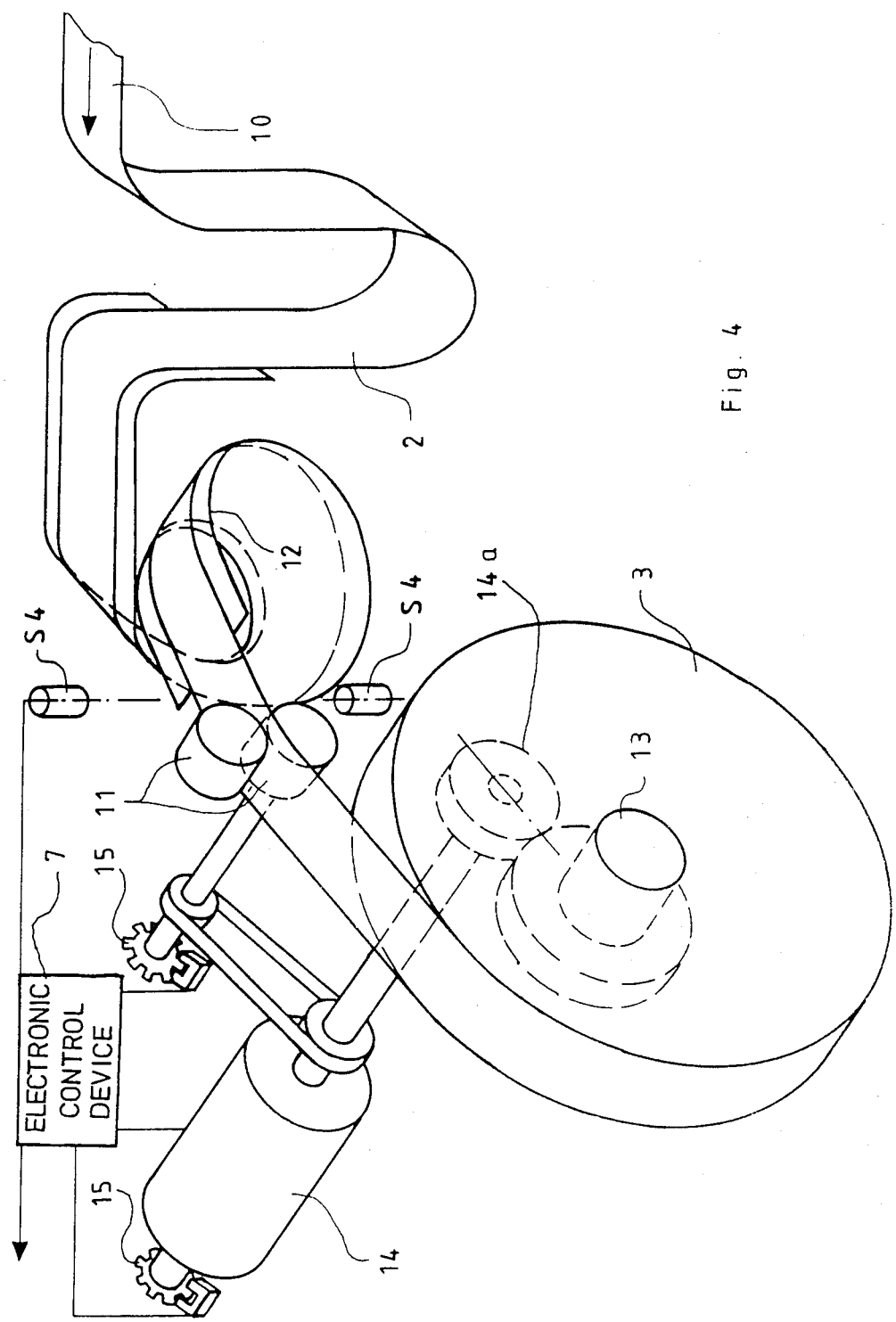
FIG. 4 is an enlarged perspective view of a conveying and guiding mechanism for use with a take-up cassette in the of FIG. 1.

Both the take-off cassette 4 and take-up cassette 6 are provided with a spool onto which the photographic paper 2 is wound to form a coil or roll. FIG. 4 shows a spool 13 carrying a large roll 3 of the photographic paper 2.

With reference again to FIG. 1, the take-off cassette 4 has a slot or opening 8 which serves as an exit for the photographic paper 2. Likewise, the take-up cassette 6 is formed with a slot or opening 9 which functions as an entrance for the photographic paper 2.

The receiving station for the take-off cassette 4 is at least partly constituted by a niche 1a defined by the printer 1 and adjusted to the shape of the take-off cassette 4. The take-off cassette 4 is disposed in one of a plurality of cassette receiving areas or locations of the niche or station 1a and each receiving area includes means for locating a cassette in an operative position.

In a similar vein, the receiving station for the take-up cassette 6 is at least partly constituted by a second niche 1b defined by the printer 1 and adjusted to the shape of the take-up cassette 6. The take-up cassette 6 is accommodated in one of a plurality of cassette receiving areas or locations of the niche or station 1b and each receiving area is again provided with means for locating a cassette in an operative position.

When the take-off cassette 4 is brought to its operative position and connected to the printer 1 in a manner known per se, the photographic paper 2 is paid out of the take-off cassette 4 and, in conventional fashion, adhesively secured to, or threaded onto, a conveyor or the trailing end of a preceding paper band for transport through the printer 1. The photographic paper 2 is conveyed through the printer 1 via conveying and guiding means designed to automatically initiate uncoiling of the photographic paper 2 from the take-off cassette 4 and to automatically advance the paper 2 to and through the printing station 5. During passage through the printing station 5, the photographic paper 2 is exposed. After exposure, the conveying and guiding means automatically advances the paper 2 to the station containing the initially empty take-up cassette 6 and automatically feeds the paper 2 into such cassette. As mentioned earlier, the take-up cassette 6 is provided with a spool 13 and the exposed photographic paper 2 is coiled onto this spool.

In the prior art, each of the receiving stations 1a, 1b has only one cassette receiving area. Thus, the receiving station 1a can accommodate only one take-off cassette 4 at any given time and, similarly, the receiving station 1b can accommodate only one take-up cassette 6 at any moment. When the take-off cassette 4 becomes empty, operating personnel must remove the same and push a fresh, loaded cassette into the operative position previously occupied by the take-off cassette 4. In like manner, the take-up cassette 6 must be removed by operating personnel when filled and replaced with a fresh, empty cassette. Removal of the cassettes 4,6 is accomplished using special handles provided on the cassettes 4,6.

The cassettes 4,6 are mounted on wheels (see FIGS. 6 and 9) in order to facilitate movement of the cassettes 4,6 which thus resemble carriages. Each of the wheels has a horizontal axis of rotation and is additionally pivotable on an axis normal to such axis of rotation, that is, on a vertical axis, so that the cassettes 4,6 can be easily moved in all directions. The cassettes 4,6 may respectively be provided with two pairs of wheels, namely, a pair of laterally spaced front wheels and a pair of laterally spaced rear wheels.

As indicated previously, the cassette receiving areas of the receiving stations 1a, 1b include means for locating cassettes in operative positions. The locating means for each receiving area may include or be constituted by a conventional, non-illustrated rail which is disposed on the ground in the respective receiving area. The rails may have a sword-like configuration or, alternatively, may be wedge-shaped or triangular and are positioned with an edge or vertex thereof directed upwards.

The rail for the take-off cassette 4 extends longitudinally of the latter and functions to align the cassette 4 transversely of the direction in which the photographic paper 2 leaves the same. Similarly, the rail for the take-up cassette 6 extends longitudinally thereof and functions to align the take-up cassette 6 transversely of the direction in which the photographic paper 2 enters such cassette. To this end, the two front wheels of each cassette 4,6 straddle the respective rail as do the two rear wheels.

In order to ascertain when replacement of the cassettes 4,6 is necessary, the printer 1 is provided with a detector S1 at the upstream end of the printing station 5 and a detector S2 at the downstream end of the station 5. The detectors S1 and S2 sense whether or not the photographic paper 2 is present. If one of the detectors S1 and S2 indicates that the photographic paper 2 is no longer present below it or between its sensors (which may, for instance, be in the form of reflex light barriers), the cassette 4 or 6 nearest such detector must be replaced. When a detector S1 or S2 senses an absence of the photographic paper 2, this detector sends a signal to an electronic control means or control device 7.

In the prior art, such signal is, for example, converted into an alarm which alerts the operating personnel who thereupon replace the appropriate cassette. By contrast, the invention intends for a fresh cassette, which is ready for use, to be operatively connected to the printer 1 in an automatic fashion without operating personnel. It is to this end that each of the receiving stations 1a, 1b is provided with more than one cassette receiving area.

In addition to the take-off cassette 4, the receiving station 1a at the inlet side of the printing station 5 accommodates two additional loaded take-off cassettes 4a, 4b at two additional loaded take-off cassettes 4a 4b at two additional receiving areas. The cassettes 4,4a,4b are identical to one another and form a group in which all of the cassettes 4,4a,4b have the same orientation. The exit or discharge openings 8 of the cassettes 4, 4a, 4b are parallel to each other and the openings 8 of the neighboring cassettes 4, 4a have the same relative position as the openings 8 of the neighboring cassettes 4a, 4b .

Analogously, the receiving station 1b at the outlet side of the printing station 5 accommodates, in addition to the take-up cassette 6, two further empty take-up cassettes 6a,6b at two additional receiving areas. The cassettes 6,6a,6b are again identical to one another and again form a group in which all of the cassettes 6,6a,6b have the same orientation. Moreover, as before, the entrance or admitting openings 9 of the cassettes 6, 6a, 6b are parallel to each other and the openings 9 of the neighboring cassettes 6, 6a have the same relative position as the openings 9 of the neighboring cassettes 6a,6b.

The arrow 10 denotes the direction in which the photographic paper 2 travels through the printing station 5 and the cassettes 4-4b and 6-6b of FIG. 1 are arranged such that the longitudinal axes thereof make an acute angle alpha with the direction 10. Due to this inclination, the leading end of a coil of photographic paper 2 carried by a take-off cassette 4, 4a,4b cannot be moving in the direction 10 upon issuing from the respective discharge opening 8. Likewise, it is not possible for the band of photographic paper 2 leaving the printing station 5 to be directly aligned with the admitting opening 9 of each take-up cassette 6, 6a,6b and to directly enter such opening. Accordingly, a drive in the form of a pair of conveying rollers 11 and a guide or deflector 12 are provided for each of the cassettes 4-4b and 6-6b. In the illustrated embodiment, each pair of conveying rollers 11 is mounted externally of the respective cassette 4-4b, 6-6b at the receiving area for the cassette. The conveying rollers 11 are positioned so that they are adjacent to the 8,9 of the cassettes 4-4b, 6-6b when the latter are in their operative positions. On the other hand, the deflectors 12 at the receiving station 1a on the inlet side of the printing station 5 are located downstream of the corresponding conveying rollers 11 while the deflectors 12 at the receiving station 1b on the outlet side of the printing station 5 are located upstream of the corresponding conveying rollers 11.

Instead of mounting the conveying rollers 11 at the receiving areas, it is possible to arrange these rollers in the cassettes 4-4b , 6-6b. It is further possible to locate each pair of conveying rollers 11 in the associated deflector 12 rather than next to the latter.

The deflectors 12, which may be constituted by sheet material guides or guide channels of appropriate configuration, serve to change the direction of travel of the photographic paper 2. In particular, the deflectors 12 at the receiving station 1a on the inlet side of the printing station 5 divert the photographic paper 2 issuing from the cassettes 4-4b so that the paper is caused to travel in the direction 10. By contrast, the deflectors 12 at the receiving station 1b on the outlet side of the printing station 5 divert the photographic paper 2 leaving the printing station 5 from the direction 10 to a direction in which the paper is aligned with the openings 9 in the cassettes 6-6b.

The conveying rollers 11 and deflectors 12 of the receiving station 1a , at least in part constitute a means for conveying and guiding the photographic paper 2 from each receiving area of the station 1a to the printing station 5. On the other hand, the conveying rollers 11 and deflectors 12 of the receiving station 1b, at least in part constitute a means for conveying and guiding the photographic paper 2 from the printing station 5 to each receiving area of the station 1b.

Figure 2:
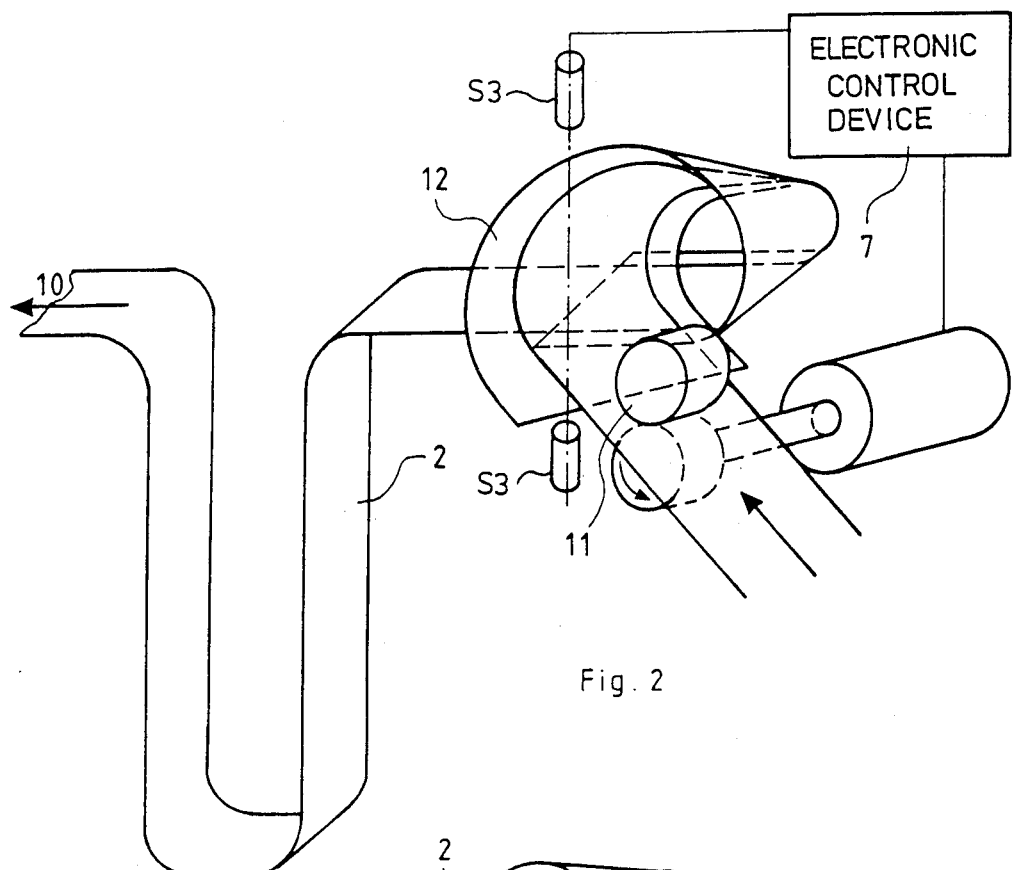
FIG. 2 is enlarged perspective view of a conveying and guiding mechanism for use with a take-off cassette in the apparatus of FIG. 1 and illustrates one manner of changing the direction of travel of photosensitive material.
Figure 3:
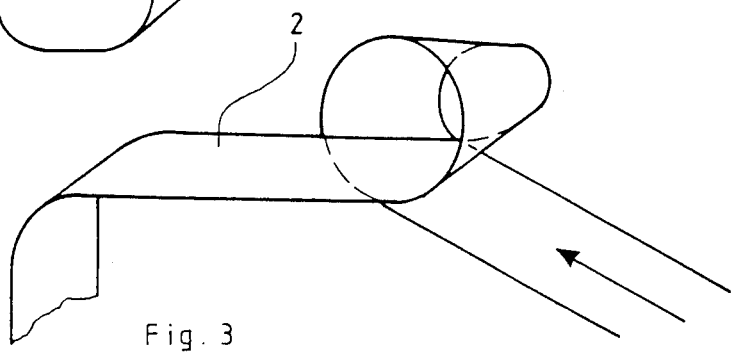
FIG. 3 is a perspective view illustrating a slightly different manner of changing the direction of the photosensitive material.

For the sake of clarity, only the paths defined by the deflectors 12, and not the deflectors 12 themselves, are illustrated in FIG. 1. One of the deflectors 12 disposed at the receiving station 1a and defining a path such as shown in FIG. 1 is illustrated in FIG. 2. FIG. 3 shows a path which is slightly different from that of the deflector 12 of FIG. 2 and is defined by an alternative, non-illustrated form of deflector. Finally, one of the deflectors 12 from the receiving station 1b, and defining a path such as shown in FIG. 1 is illustrated in FIG. 4.

With reference still to FIGS. 1, 2 and 4, an additional detector S3 for sensing the presence and absence of the photographic paper 2 is mounted in or immediately outside of each deflector 12 at the receiving station 1a. Each detector S3 is located in a region where the leading end of a coil carried by the respective take-off cassette 4, 4a, 4b would lie when the cassette 4, 4a, 4b is in its operative position and ready for use. Similarly, an additional detector S4 for sensing the presence and absence of the photographic paper 2 is mounted in or immediately outside to each deflector 12 at the receiving station 1b, Here, each detector S4 is located in a region where no photographic paper 2 is present when the associated take-up cassette 6-6b is empty and is in its operative position ready for use.

The detectors S3, S4 and the motors for the conveying rollers 11 are connected to the electronic control device 7. Furthermore, as shown in FIG. 4, the spools 13 of the take-up cassettes 6-6b are coupled to respective motors 14 via transmissions 14a, when the cassettes 6-6b are in their operative positions and the motors 14 are likewise connected to the electronic control device 7.

When a detector S3 corresponding to one of the take-off cassettes 4-4b , connected to the printer 1 no longer senses the photographic paper 2, the respective take-off cassette 4-4b is empty and the detector S3 sends an appropriate signal to the control device 7. The control device 7 now seeks out another detector S3 which, as indicated by a predetermined signal emitted by such detector, senses the leading end of a coil of photographic paper 2 carried by the associated take-off cassette 4-4b. Upon finding such a detector S3, the control device 7 activates the conveying rollers 11 for the corresponding take-off cassette 4-4b. The photographic paper 2 is thus withdrawn from such cassette and transported to the printing station 5 via the respective deflector 12 and a guide which extends by all of the receiving areas of the receiving station 1a, when the leading end of the photograhic paper 2 from the fresh take-off cassette 4-4b passes by the detector S1, it is advanced through the printing station 5 by means of suitable conveying and guiding means in the station 5. The conveying rollers 11 of the fresh take-off cassette 4-4b are kept in operation via the control device 7.

Once the leading end of the new band of photographic paper 2 has passed through the printing station 5, the paper 2 begins to be coiled or wound into an empty take-up cassette 6-6b. This is accomplished by directing the leading end of the paper 2 into the deflector 12 of a take-up cassette 6-6b which is empty as indicated by the fact that the associated detector S4 had been emitting a signal representative of the absence of photograhic paper 2 in the deflector 12. When the leading end of the paper passes by this detector S4, the latter sends a predetermined signal to the control device 7 which activates the respective conveying rollers 11, an automatic device of conventional design for threading the paper 2 into the associated take-up cassette 6-6b and the motor 14 for the spool 13 of such cassette. Further regulation is then carried out from the printing station 5, e.g., via the control device 7 and a speed sensor 15 shown in FIG. 4. The conveying rollers 11, threading device and motor 14 of the operative take-up cassette 6-6b are kept in operation until the band of photographic paper 2 has been coiled onto the spool 13. The speed sensor 15 which may, for example, be constituted by a counter, can function, among other things, to indicate when the spool 13 is full. At such time, an appropriate signal is sent to the control device 7 which temporarily stops the printer 1. The band of photographic paper 2 is cut and the severed end now constituting the leading end of that section of the paper 2 which is still to be processed is directed to the next available take-up cassette 6-6b. Here, such severed end is fed into the take-up cassette 6-6b in the manner described earlier.

The printer 1 is provided with an indicator which functions to alert the operating personnel when the last of the loaded take-off cassettes 4-4b or the last of the empty take-up cassettes 6-6b is automatically brought into service as explained above. This indicator may generate an alarm, for example, in order to advise the operating personnel that those of the cassettes 4-4b,6-6b which have already been used must be replaced if the automatic operation is to continue.

In the embodiment of FIG. 1, the receiving station 1a on the inlet side of the printing station 5 is designed such that the take-off cassettes 4-4b are arranged beside each other and extend parallel to one another. The longitudinal sides of the take-off cassettes 4-4b, which are generally flat and parallel to the longitudinal axes of the cassettes 4-4b, define an acute angle alpha with the direction 10 in which the photographic paper 2 travels through the printing station 5. The inclination is such that the discharge openings 8 of the take-off cassettes 4-4b have a line of sight in the direction 10.

Similarly, the receiving station 1b on the outlet side of the printing station 5 is designed so that the take-up cassettes 6-6b are disposed next to each other and extend parallel to one another. The longitudinal sides of the take-up cassettes 6-6b, which are again generally flat and parallel to the longitudinal axes of the cassettes 6-6b, again make an acute angle alpha with the direction 10. In this case, the inclination is such that the admitting openings 9 of the take-up cassettes 6-6b, have a line of sight counter to the direction 10.

The receiving stations 1a and 1b are constructed so that the group of take-off cassettes 4-4b and the group of take-up cassettes 6-6b are symmetrical with respect to one another about a plane normal to the direction 10 and intersecting the printing station 5 midway between the stations 1a,1b.

When the take-off cassettes 4-4b are brought into their operative positions preparatory to service, the coils of photographic paper 2 carried by the cassettes 4-4b are paid out to such an extent that the leading ends of the coils lie within the scanning ranges of the respective detectors S3. In these positions, the leading ends coincide with the direction 10 so that, when the corresponding conveying rollers 11 are activated, the leading ends are advanced directly into the printing station 5.

Due to the fact that the take-off cassettes 4-4b are inclined to the direction 10 at an acute angle alpha, the photographic paper 2 leaving the cassettes 4-4b, must be deflected along a path resembling the outline of a goblet or an asymmetrical frustum of a cone. The same holds true for the photographic paper 2 issuing from the printing station 5 and entering the take-up cassettes 6-6b. FIGS. 1-4 show the paths followed by the photographic paper 2 leaving the take-off cassettes 4-4b and entering the take-up cassettes 6-6b. The guide surfaces of the deflectors 12 must be formed accordingly.

More difficult than the problem of changing the direction of travel of the photographic paper 2 to and from the direction 10 is that of directing the leading end of the photographic paper 2 to the deflector 12 of an available take-up cassette 6-6b when the leading end exits the printing station 5. An arrangement such as, for example, shown in FIG. 8 may be used for this purpose. In principle, this arrangement can be used not only for a group of take-up cassettes 6-6b, disposed as in the embodiment of FIG. 1 but also for groups of take-up cassettes 6-6b arranged as in certain other embodiments to be described below.

Figure 8:
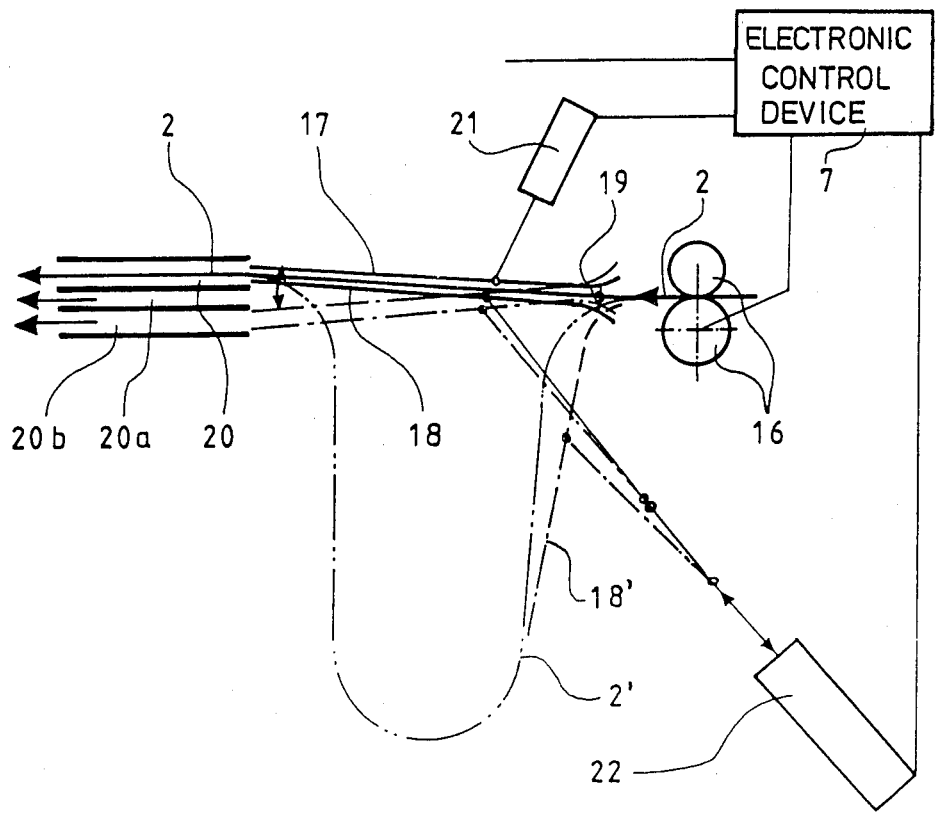
FIG. 8 is a side view of another embodiment of a conveying and guiding mechanism for use with a take-up cassette.

As mentioned previously, the printing station 5 includes means for conveying and guiding the photographic paper 2 therethrough. The conveying and guiding means may include pairs of conveying rollers and the last such pair is shown in FIG. 8 and identified by the reference numeral 16. Downstream of the rollers 16 is a first guide channel formed by two flaps 17 and 18 which can be spread apart by pivoting the flap 18 away from the flap 17. The guide channel 17,18 is here pivotable as a unit about a pivot or fulcrum 19 but could instead be slidable as a unit and may also be telescopic. Following the pivotable guide channel 17,18 are three fixed guide channels 20,20a,20b, which lead to the deflectors 12 of the three take-up cassettes 6-6b, respectively. The fixed guide channels 20-20b are shown as being disposed one above the other but could just as well be arranged side-by-side.

If the control device 7 receives a signal indicating that the take-up cassette 6 is available to receive the photographic paper 2, the control device 7 causes the guide channel 17,18 to pivot into alignment with the fixed guide channel 20 leading to the deflector 12 of the take-up cassette 6. Pivoting of the guide channel 17,18 is accomplished by means of a conventional lever arrangement 21,22. The leading end of the photographic paper 2 is then advanced by the conveying rollers 16 through the pivotable guide channel 17,18 and the fixed guide channel 20 directly into the deflector 12 corresponding to the take-up cassette 6. When the take-up cassette 6 becomes filled and the band of photographic paper 2 is to be coiled into another take-up cassette 6a, or 6b which is available to receiving the paper 2, the guide channel 17,18 is pivoted into alignment with another fixed guide channel 20a or 20b.

The detector S4 and speed sensor 15 associated with a take-up cassette 6-6b, which is in the process of being loaded send appropriate signals to the control device 7 once the photographic paper 2 has been entrained by the spool 13 of the respective take-up cassette 6-6b. The control device 7 then causes the lower flap 18 of the guide channel 17,18 to pivot downwards away from the flap 17 to the position indicated at 18'. This allows the photographic paper 2 to develop a loop 2' as is normally desirable. When the take-up cassette 6-6b, undergoing loading has been filled and another take-up cassette 6-6b. is to be placed in service, the lower flap 18 of the pivotable guide channel 17,18 is first pivoted out of the position 18' back to its original position relative to the flap 17.

The inclined positioning of the cassettes 4-4b,6-6b as in FIG. 1 requires a relatively large amount of space. However, it has the advantage that the inclined cassettes 4-4b,6-6b can be individually replaced very easily. Thus, the cassettes 4-4b,6-6b can be moved into their operative positions by simply pushing them in the direction of inclination and, likewise, can be removed from their operative positions by simply pulling them along the direction of inclination.

Figure 5:
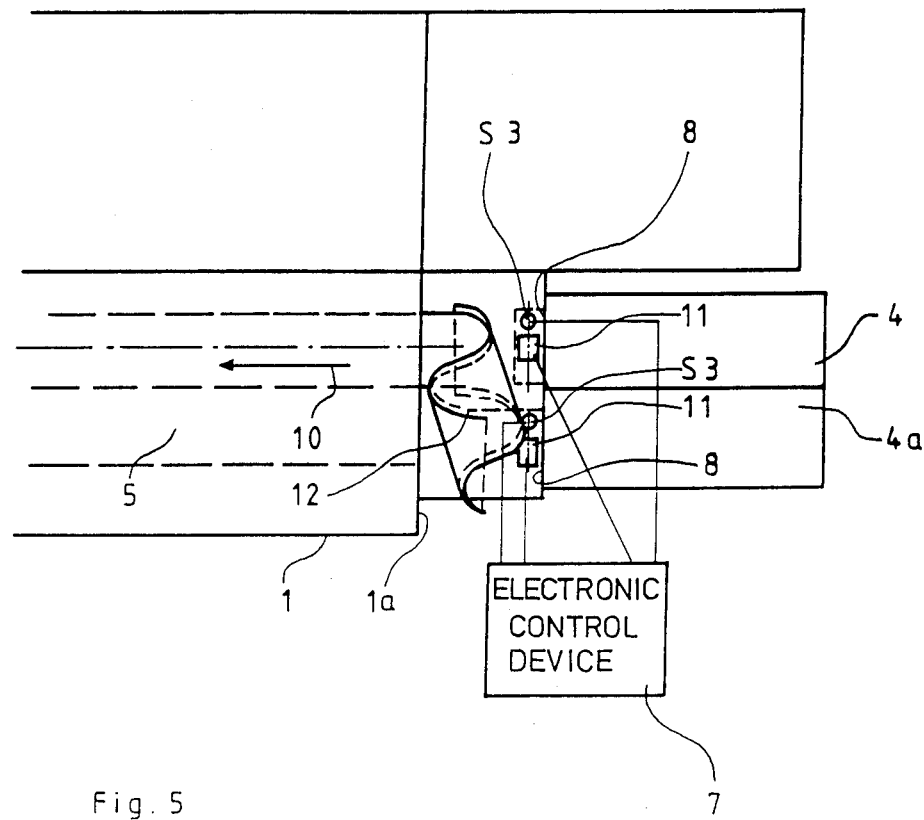
FIG. 5 is a schematic fragmentary plan view of another embodiment of the processing apparatus in accordance with the invention.

An arrangement of a group of cassettes requiring less room is illustrated in FIG. 5 with reference to the take-off cassettes 4,4a. The receiving station 1a, on the inlet side of the printing station 5 is here designed to accommodate the take-off cassettes 4,4a in such a manner that the longitudinal sides and axes of the latter are parallel to the direction 10 in which the photographic paper 2 travels through the printing station 5. The take-off cassettes 4,4a are disposed next to one another with their neighboring longitudinal sides in abutment and the discharge openings 8 facing directly in the direction 10. The position of the take-off cassette 4 is such that the photographic paper 2 which issues therefrom is in register with the path of the photographic paper 2 through the printing station 5 and need not undergo a change in direction. On the other hand, the photographic paper 2 discharged from the take-off cassette 4a, and any additional take-off cassettes must be deflected several times, i.e., must undergo several changes in direction. To this end, the individual deflectors 12 of the receiving station 1a of FIG. 1 are replaced by a single deflector 12 having a series of arcs or a wave-like configuration. The wave-like deflector 12, which may be made of sheet material, extends by all of the receiving areas of the receiving station 1a .

Figure 6:
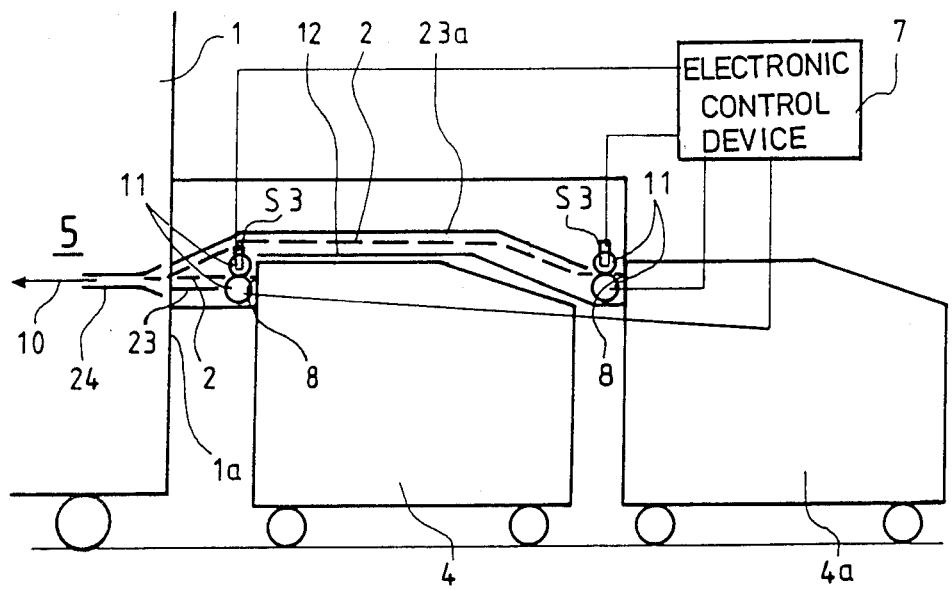
FIG. 6 is a schematic fragmentary side view of an additional embodiment of the processing apparatus according to the invention.
Figure 7:
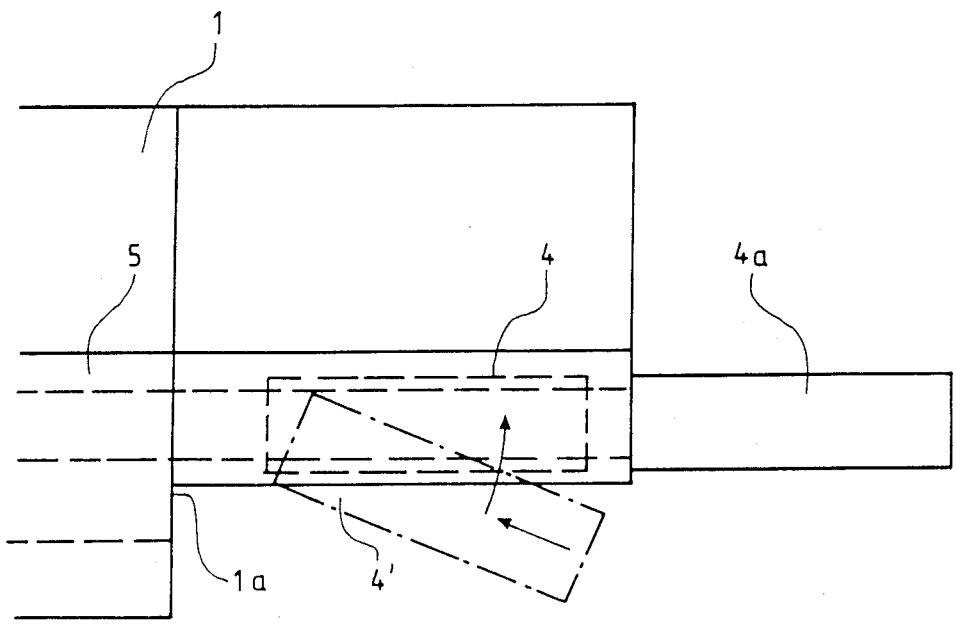
FIG. 7 is a fragmentary plan view of the apparatus of FIG. 6.

FIGS. 6 and 7 illustrate an arrangement of a group of cassettes, again with reference to the take-off cassettes 4 and 4a, which requires a relatively long but narrow space. As in FIG. 5, the receiving station 1a at the inlet side of the printing station 5 is designed to accommodate the take-off cassettes 4,4a so that the longitudinal sides and axes of these cassettes are parallel to the direction 10 in which the photographic paper 2 travels through the printing station 5. However, in contrast to FIG. 5, the receiving station 1a of FIGS. 6 and 7 is constructed such that the take-off cassettes 4,4a are positioned one behind the other with the discharge openings 8 facing directly in the direction 10 and registering with the path of travel of the photographic paper 2 through the printing station 5. The printing station 5 has an inlet 24 for the paper 2 and a guide channel 23 connects the discharge opening 8 of the take-off cassette 4 with the inlet 24. A second guide channel 23a leads from the discharge opening 8 of the take-off cassette 4a to the inlet 24.

The photographic paper 2 issuing from the printing station 5 of FIGS. 6 and 7 may be fed into the take-up cassettes 6-6b using the mechanism of FIG. 8.

The structure of FIGS. 6 and 7 has the advantage that the cassettes 4-4b ,6-6b, may be individually replaced quite easily. This is illustrated in FIG. 7 where the reference numeral 4' denotes a take-off cassette in the process of being moved into the operative position of the take-off cassette 4. The straight arrow shows that the cassette 4' is first rolled into the receiving station 1a along a direction which is inclined to the direction 10 while the curved arrow shows that the cassette 4' is subsequently shifted into the operative position by rotating the same counterclockwise.

Figure 10:
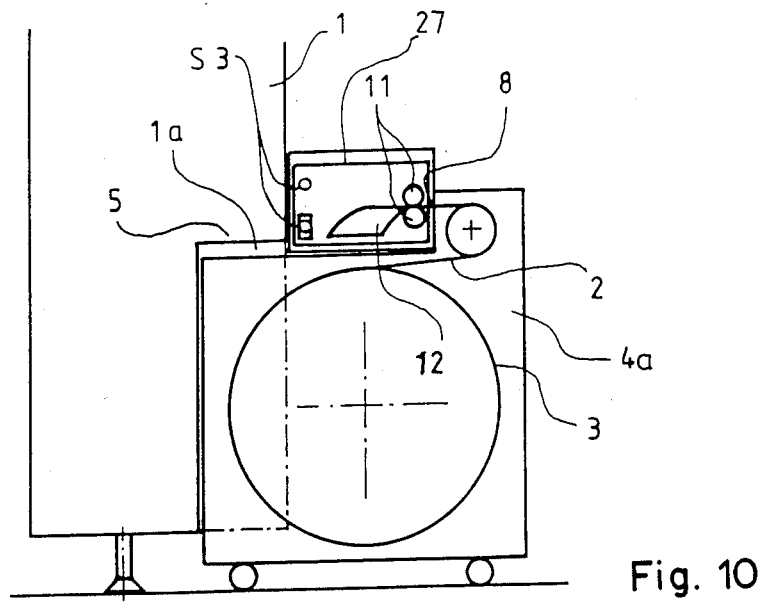
FIG. 10 is a view as seen in the direction of the arrows X—X of FIG. 9.
Figure 9:
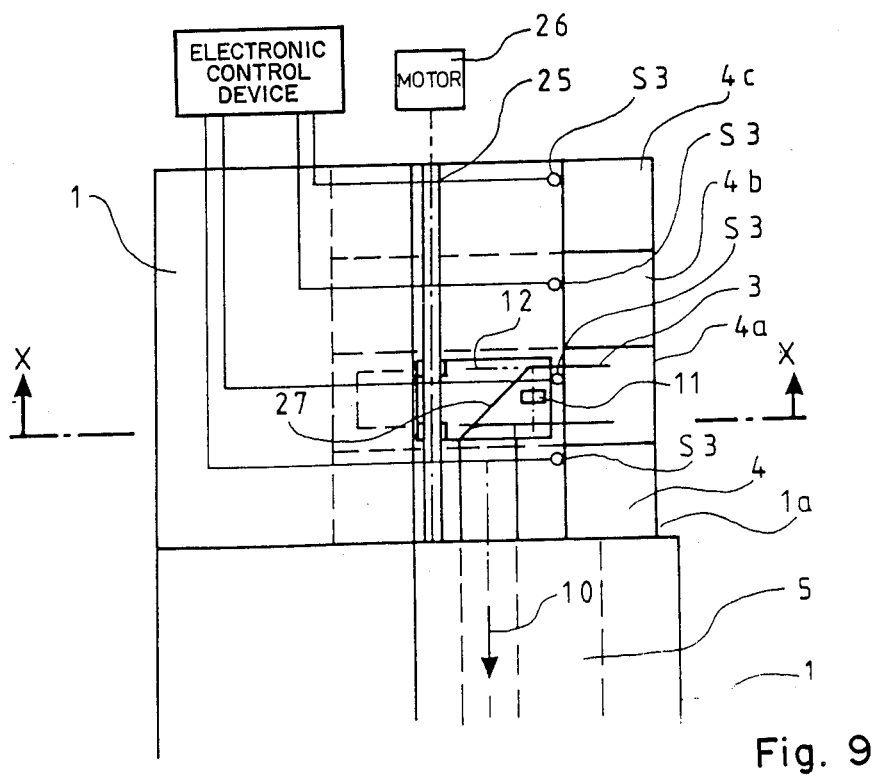
FIG. 9 is a schematic fragmentary plan view of a further of the processing apparatus in accordance with invention.

The arrangement according to the invention requiring the least amount of space is probably that of FIGS. 9 and 10. In this arrangement, which is illustrated with reference to the take-off cassettes 4-4b. and an additional take-off cassette 4c, the receiving station 1a at the inlet side of the printing station 5 is designed to accommodate the take-off cassettes 4-4c side-by-side with the longitudinal sides and axes of the cassettes normal to the direction 10 in which the photographic paper 2 travels through the printing station 5. The take-off cassettes 4-4c, are positioned with their discharge openings 8 upwards.

Figure 11:
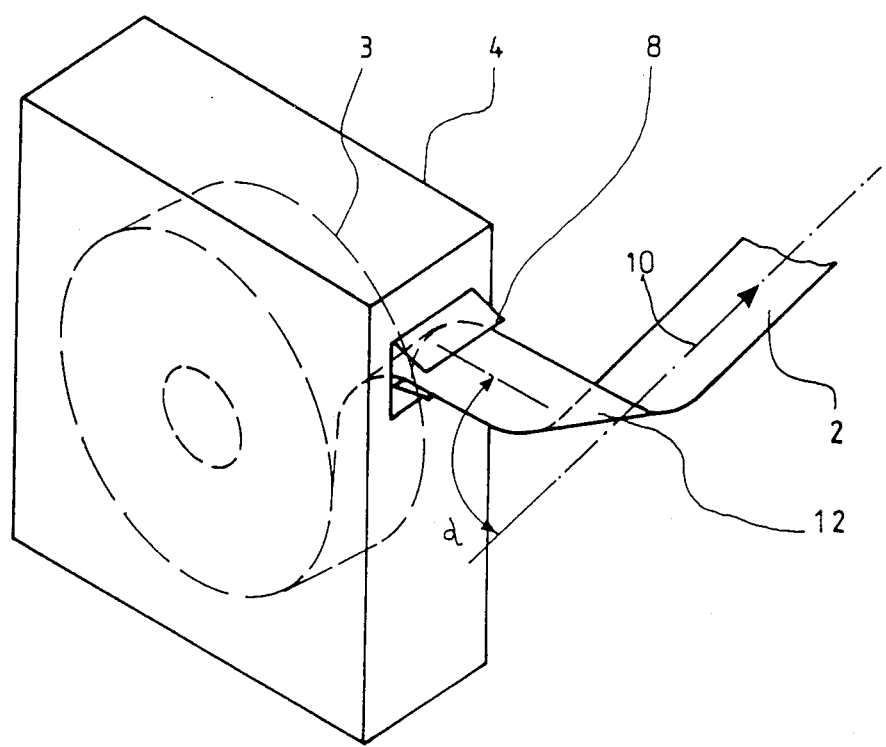
FIG. 11 is a perspective view of a cassette illustrating one manner of changing the direction of the photosensitive material in the apparatus of FIG. 9.

FIG. 11 is an enlarged view of the take-off cassette 4 of FIGS. 9 and 10 and illustrates that the photographic paper 2 issuing from the discharge openings 8 of the take-off cassettes 4-4c must be deflected through an angle of 90° in order to orient the paper 2 along the direction 10. In the embodiment of FIGS. 9 and 10, deflection of the paper 2 is accomplished using a travelling guide mechanism 27 which carries a deflector 12. The guide mechanism 27, which is shown schematically, is mounted for movement along a shaft or spindle 25 which extends by all of the receiving areas of the receiving station 1a. An adjusting motor 26 regulated by the control device 7 serves to move the guide mechanism 27 along the shaft 25 and to position the guide mechanism 27 in front of the discharge opening 8 of that take-off cassette 4-4c which is to supply the photographic paper 2 to the printing station 5.

The deflector 12 of the guide mechanism 27 may be made of sheet material shaped to correspond to the external outline the bend shown in FIG. 11 for the photographic paper 2. The deflector 12 is positioned at a location in register with the discharge opening 8 of the take-off cassette 4-4c which is to deliver the photographic paper 2 to the printing station 5 and to the outer side of the band of photographic paper 2.

The sheet material deflector 12 may be replaced by several appropriately arranged pairs of rollers which can be shifted to a position in front of the conveying rollers 11 of the take-off cassette 4-4c to be placed in service.

In the embodiments of FIGS. 5, 6–7 and 10–11, the receiving station 1b on the outlet side of the printing station 5 may be designed similarly to the corresponding receiving station 1a on the inlet side.

When the photographic paper 2 issues from a take-off cassette 4-4c, the emulsion side should face in a direction which, taking into consideration the required position of this side in the printing station 5, causes the emulsion side to contact the smallest possible number of the conveying and guiding elements 11, 12, 17, 18, 20-20b, 23 and 23a. The emulsion side of the photographic paper 2 upon entry of the latter into a take-up cassette 6-6b should likewise face in such direction. This feature, which applies to all of the illustrated embodiments, allows scratching of the emulsion side to be minimized.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. An apparatus for processing photosensitive material, comprising a processing station for such material; at least one station to one side of said processing station designed to accommodate a plurality of carriage-like cassettes for photosensitive material at respective locations of said one station, means for conveying and guiding photosensitive material between said processing station and each of said locations; detecting means for sensing the presence and absence of photosensitive material in the region of each of said locations; and control means operable to activate said conveying and guiding means in response to signals from said detecting means, said control means causing said conveying and guiding means to transport photosensitive material between said processing station and a preselected one of said locations when said detecting means issues a predetermined signal from the region of said preselected location.

2. The apparatus of claim 1, further comprising an additional station to another side of said processing station designed to accommodate a plurality of carriage-like cassettes for photosensitive material at respective additional locations of said additional station; additional detecting means for sensing the presence and absence of photosensitive material in the region of each of said additional locations; and additional means for conveying and guiding photosensitive material between said processing station and each of said additional locations, said control means causing said additional conveying and guiding means to transport photosensitive material between said processing station and a preselected one of said additional locations when said additional detecting means issues a predetermined signal from the region of said preselected additional location, and said conveying and guiding means being designed to withdraw photosensitive material from a cassette at said one station, convey the material into and out of said processing station and introduce the material into a cassette at said additional station.

3. The apparatus of claim 1, wherein said one station is designed to position all of the cassettes in the sam orientation.

4. The apparatus of claim 1, wherein said conveying and guiding means includes a guide in the region of each of said locations.

5. The apparatus of claim 1, wherein said detecting means includes a detector in the region of each of said locations.

6. The apparatus of claim 1, wherein said conveying and guiding means includes a drive in the region of each of said locations.

7. The apparatus of claim 1, wherein said processing station comprises a printer.

8. The apparatus of claim 1, wherein said processing station comprises a developer.

9. The apparatus of claim 1, wherein said conveying and guiding means includes a guide of sheet material in the region of each of said locations.

10. The apparatus of claim 9, wherein said conveying and guiding means further includes a pair of conveying rollers in the region of each of said guides.

11. The apparatus of claim 1, wherein said conveying and guiding means includes a guide in the region of each of said locations, and a channel between said processing station and said guides, said channel being movable by said control means to a plurality of positions in each of which said channel directs photosensitive material to a different one of said guides.

12. The apparatus of claim 11, wherein said channel is pivotable, slidable or telescopic.

13. The apparatus of claim 11, wherein said conveying and guiding means further includes a plurality of fixed channels between said movable channel and said guides, each of said fixed channels being in register with a different one of said guides.

14. The apparatus of claim 13, wherein said fixed channels are disposed one above the other or next to one another.

15. The apparatus of claim 1, wherein said conveying and guiding means is designed to transport photosensitive material into said processing station along a predetermined direction, each of the cassettes having a longitudinal axis, and said one station being designed to position the cassettes so that the longitudinal axes thereof define an acute angle with said predetermined direction.

16. The apparatus of claim 15, further comprising an additional station for a plurality of carriage-like cassettes for photosensitive material, said additional station being disposed to a side of said processing station opposite said one side and being designed to position the respective cassettes such that the cassettes in said one station and the cassettes in said additional station are approximately symmetrical about a plane normal to said predetermined direction.

17. The apparatus of claim 1, wherein said conveying and guiding means comprises a guide in the region of each of said locations, each of said guides defining a path which resembles a goblet or an asymmetrical frustum of a cone.

18. The apparatus of claim 1, wherein said conveying and guiding means is designed to transport photosensitive material into said processing station along a predetermined direction, each of the cassettes having a longitudinal axis, and said one station being designed to position the cassettes so that the longitudinal axes thereof are substantially parallel to said predetermined direction.

19. The apparatus of claim 18, wherein said locations are one behind the other, said conveying and guiding means including a channel between each of said locations and said processing station.

20. The apparatus of claim 19, wherein said channels are disposed one above the other.

21. The apparatus of claim 18, wherein said locations are next to one another, said conveying and guiding means including an arcuate guide which bridges said locations and is disposed between the latter and said processing station.

22. The apparatus of claim 1, wherein said conveying and guiding means is designed to transport photosensitive material into said processing station along a predetermined direction, each of said cassettes having a longitudinal axes, and said one station being designed to position the cassettes so that the longitudinal axes thereof are substantially normal to said predetermined direction.

23. The apparatus of claim 1, wherein said conveying and guiding means includes a guide which is automatically movable by said control means to each of said locations.

* * * * *